(12) United States Patent
Ward

(10) Patent No.: US 6,206,049 B1
(45) Date of Patent: Mar. 27, 2001

(54) APPARATUS AND METHOD FOR THE ROBOTIC REPAIRING OF AN UNDERGROUND PIPE JUNCTION WITH REMOVABLE HEATING ELEMENT

(75) Inventor: Robert M. Ward, Glenwood Springs, CO (US)

(73) Assignee: Tele Environmental Systems, Rifle, CO (US)

(*) Notice: Subject to any disclaimer, the term of this patent is extended or adjusted under 35 U.S.C. 154(b) by 0 days.

(21) Appl. No.: 09/606,894

(22) Filed: Jun. 29, 2000

Related U.S. Application Data

(63) Continuation-in-part of application No. 09/426,816, filed on Oct. 22, 1999, now Pat. No. 6,082,411, which is a continuation-in-part of application No. 09/196,607, filed on Nov. 20, 1998, now Pat. No. 5,971,032.

(51) Int. Cl.[7] ........................................................ F16L 55/16
(52) U.S. Cl. ............................ 138/98; 138/97; 156/287; 264/269
(58) Field of Search .................... 138/98, 97; 405/150.1; 156/287; 264/267, 269

(56) References Cited

U.S. PATENT DOCUMENTS

| | | | |
|---|---|---|---|
| 4,724,108 | * | 2/1988 | Jurgenlohmann et al. ........ 138/98 X |
| 5,040,922 | * | 8/1991 | Himmler ............................ 138/97 X |
| 5,333,649 | * | 8/1994 | Shimokawa et al. .............. 138/98 X |
| 5,692,543 | * | 12/1997 | Wood ..................................... 138/98 |
| 5,915,419 | * | 6/1999 | Tweedie et al. ........................ 138/98 |

FOREIGN PATENT DOCUMENTS

550860 * 7/1993 (DE) ..................................... 138/98

* cited by examiner

*Primary Examiner*—Patrick Brinson
(74) *Attorney, Agent, or Firm*—Sheridan Ross P.C.

(57) ABSTRACT

An apparatus and method for sealing an underground junction between a lateral service line and a main pipeline from the inside-out. One embodiment provides a substantially rigid patching apparatus which may be positioned and installed with a robotic device within a main pipeline. The patching apparatus has a flange shaped to fit the internal diameter of the main pipeline and a tubular stem or sleeve which penetrates into the lateral service line. The patching apparatus contains an interconnection substrate such as felt, sponge or other similar material. The interconnection substrate may be impregnated with a bonding agent which sealingly interconnects the patching apparatus to the main pipeline and lateral service line, and may be heated by utilizing a heating element within a support cage, thus reducing the time required for curing.

18 Claims, 4 Drawing Sheets

APPARATUS AND METHOD FOR THE ROBOTIC REPAIRING OF AN UNDERGROUND PIPE JUNCTION WITH REMOVABLE HEATING ELEMENT

This application is a continuation-in-part application of U.S. patent application Ser. No. 09/426,816, having a filing date of Oct. 22, 1999 now U.S. Pat. No. 6,082,411, which was a continuation-in-part application of U.S. application Ser. No. 09/196,607, now U.S. Pat. No. 5,971,032, having a filing date of Nov. 20, 1998, both applications incorporated herein by reference in their entirety.

FIELD OF THE INVENTION

This invention relates to an apparatus and method for remotely repairing existing underground pipe junctions from the inside-out, as opposed to digging a trench and replacing or repairing the pipe from the outside-in. More specifically the present invention relates to a support cage used with setting a patch during the repair of an underground pipe junction which can be selectively heated to enhance the curing time of sealing resins, epoxies and the glues used during the installation of the underground patch.

BACKGROUND OF THE INVENTION

Sewer lines, water lines and other types of buried pipelines can develop leaks over time. These leaks are a result of decaying materials such as the clay used in the construction of the pipeline, obstructions which may clog a line, chemical exposure or crushing due to overburden pressure due to the inferior materials used in very old pipelines. Many older lines require repair to prevent exterior leaking and possible ground water contamination. Additionally, without proper repair ground water can infiltrate into the broken sewer lines, thus causing significant increase in the volume of throughput and the expense of chemicals and other materials used for treatment of the sewer water.

Repairing leaking sewer lines and other forms of fluid transmission lines is very expensive due to the previous necessity of digging a trench from the surface to physically remove the pipe. The removal and replacement of this pipe from the surface is time-consuming, expensive and not practical in many old commercial and residential neighborhoods due to narrow alleyways, heavy traffic and the volume of pipe located below existing buildings or other obstructions.

Thus, "trenchless technology" was developed which utilizes machinery and methods of repairing sewer pipe and other buried transmission lines from the inside-out. This process eliminates the need for digging expensive trenches aboveground. In brief, the existing main pipeline is repaired by installing a plastic liner which is inserted into the existing pipeline. The plastic liner is then bonded to the internal surface of the existing pipeline by heating or other methods. The existing lateral service lines which feed the main pipeline are then located by the use of a robotic device with an optical camera. Once identified, a hole is drilled by the robot mechanism into the existing pipeline, thus providing access into the lateral service line.

Unfortunately, the hole drilled into the existing lateral service line does not provide a satisfactory seal, thus permitting significant volumes of groundwater, as well as plant roots, dirt and other foreign objects to infiltrate the main pipeline at the junction point between the lateral service line(s) and the main pipeline. Additionally, contaminants within the main pipeline can potentially leak and pollute the adjacent groundwater. Thus, a need exists to provide a reliable patching mechanism to seal the junction point between the lateral service line and main pipeline which can be operated remotely and which functions from within the small internal confines of the main pipeline.

Others have attempted to seal the junction between the main pipeline and lateral service line, but known approaches have considerable disadvantages. U.S. Pat. No. 5,329,063 to Endoh exemplifies a technique where a flexible tubular liner is inserted into a lateral line so that the entire lateral line receives a lining. Air or liquid pressure is needed to insert the reversed flexible liner into the lateral. Once the liner is extended by the air pressure from the junction to the other end of the lateral pipe, access to that other end of the lateral line is required to cut away any excess liner. In this way, the entire lateral pipe is lined from one end to the other.

As those skilled in the art can appreciate, installing a flexible liner in a lateral service line is very time consuming and difficult. The apparatus required for installation has many moving parts and is complex to operate. Additionally, access to the distal end of the lateral line (i.e., the end away from the main pipeline) is needed to cut away the excess liner. The complex setup required makes sealing the junction of the main pipeline and lateral service line both time consuming and expensive.

Further, the results achieved by the flexible liners are erratic because the lateral service line is not a controlled environment. For example, the lateral may contain debris which will obstruct the flexible liner so that when the liner is hardened, the obstructions will permanently interfere with the flow in the lateral line. Additionally, the environment in which the flexible liner must be installed into is subject to wide temperature swings which further encumbers achieving consistent results. Therefore, there is a need for quickly and inexpensively sealing the junction between a main pipeline and lateral service line with consistent results. This is especially needed in situations where it is difficult or impractical to obtain access to the distal end of a lateral service line. Further, there is a need for quickly curing the epoxy, glue or resins which are used as a sealing medium between the underground patch and the lateral pipeline and main pipeline.

SUMMARY OF THE INVENTION

It is thus one object of the present invention to provide an apparatus and method for sealing the junction point between a lateral service line and a main pipeline from the inside-out, i.e., using trenchless technology. Thus, in one aspect of the present invention a patching apparatus is provided which may be positioned and installed with a robotic device within a main pipeline. The patching apparatus in one embodiment is comprised of a polyvinyl chloride (PVC) material, or the like, having a flange which is shaped to fit the internal diameter of the main pipeline and an extending stem which penetrates into the lateral service line.

In another aspect of the present invention, the patching apparatus flange contains an interconnection substrate such as felt, sponge or another similar material to provide a resilient, compressible material suitable for sealing the pipe junction. The interconnection substrate may be impregnated with a bonding agent such as a water activated epoxy or grout which sealingly interconnects the patch to the main pipeline and lateral service line. Alternatively, an adhesive, glue, or other type of material may be applied to the interconnector substrate just prior to installation. To further provide sealing in another embodiment, an annular gasket may be positioned around the stem portion to promote sealing engagement between the stem and the internal surface of the lateral service line. The seal provided by the inverted-tee patch effectively eliminates most water intrusion or the influx of plant roots and other matter at the junction point which can seriously damage or obstruct the main pipeline.

It is yet another object of the invention to provide a remotely controlled robotic arm capable of applying the inverted-tee patch to the junction between the main pipeline and lateral service line from within the main pipeline. The robotic arm includes a support cage which holds the inverted-tee patch in place during insertion. The robotic arm laterally extends to apply the patch to the junction. Thus, in yet another aspect of the present invention a robotic arm is interconnected to a substantially elongated robot capable of traveling within a main sewer or other transmission line. The elongated robot is generally positioned by means of a remotely controlled assembly with an optical camera mechanism which properly identifies the junction point of the main pipeline and lateral service line.

It is yet another object of the present invention to provide a substantially rigid patch which does not require curing or the application of pressure to install the patch at the junction between the lateral service line and the main pipeline. Thus, the possibility of error is reduced since the patch is preformed and as such is not susceptible to deformation or failure as a result of non-controllable environmental factors such as debris in the pipeline, cold temperatures, etc. Furthermore, this type of patch does not require an entire service line to be lined, but only the junction point. Thus, significant time and expense can be saved while achieving a greater degree of reliability.

It is another aspect of the present invention to provide a heating apparatus which can be positioned below the patch mechanism, to accelerate the curing of the glue/epoxy bonding agent which is positioned between the patch and main pipeline. In one embodiment the heating element may be an integral part of the support cage, or alternatively be a separate component which is positioned below, or adjacent the existing support cage. To activate the heating element, a remote control power source may be used to selectively provide electrical heat energy to the heating mechanism for a predetermined period of time. Alternatively, a battery operated mechanism may be used which has a timer which automatically activates and provides heat energy to the patch after a predetermined time period or upon activation of the scissor multiplier to place the patch in its final position of use. Alternatively, different types of energy sources can be used to quickly cure the glue, epoxy or other type of adhesive, including ultra-violet light energy, radiation, or other energy sources commonly known in the art.

Thus, in one aspect of the invention, the following method is provided for installing a pipeline patch and quickly curing the epoxy required for sealing purposes:

A method for remotely installing a patch to an underground junction between a main pipeline and a lateral service line, comprising the steps of:

(a) providing a patch comprising:
a tubular stem having a first end, a second end and a first length, wherein the second end has a substantially open aperture for communication with the lateral service line:
a convex flange having an exterior surface, an interior surface and a cutout portion operatively sized and interconnected to the first end of said tubular stem, wherein the second end of said tubular stem extends away from the exterior surface of said convex flange; and
a sealing substrate positioned on said exterior surface of said convex flange for providing sealing engagement between said convex flange and an interior surface of the main pipeline;

(b) determining a location of the junction between the main pipeline and the lateral service line;

(c) removably attaching said patch to a support cage having a heating element;

(d) positioning said patch proximate the location of the underground junction;

(e) activating a lateral extender to move said support cage from a first traveling position to a second engagement position so that said patch is positioned with said tubular stem within the lateral service line and said sealing substrate is positioned against an internal surface of the main pipeline proximate to said lateral service line;

(f) providing an external energy source to said sealing substrate to accelerate the curing of said sealing substrate, wherein said patch becomes fixedly connected to the internal surface of the main pipeline;

(g) deactivating the lateral extender to move said support cage from the second engagement position to the first traveling position; and (h) removing said lateral extender and said support cage from the main pipeline.

DETAILED DESCRIPTION OF THE PREFERRED EMBODIMENT

The present invention generally relates to trenchless technology for the repair and reinforcement of pipes. More particularly, the present invention provides a method and an apparatus for installation of a patch to a junction between a lateral service line and a main pipeline.

Figure 1:
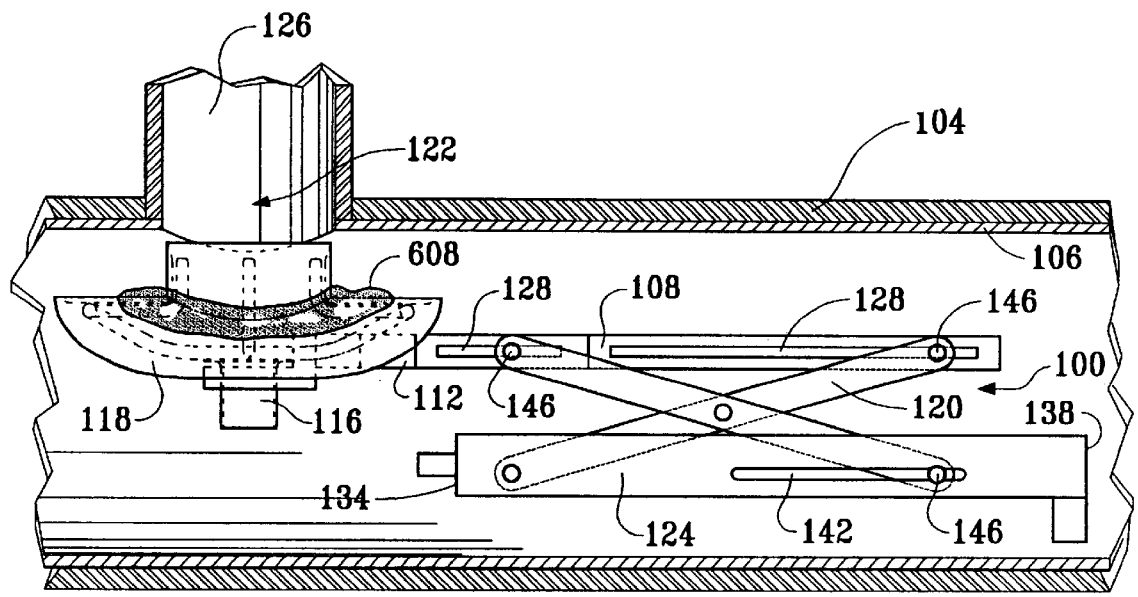
FIG. 1. is a side view of an robotic arm holding an inverted-tee patch immediately prior to insertion into a lateral.
Figure 2:
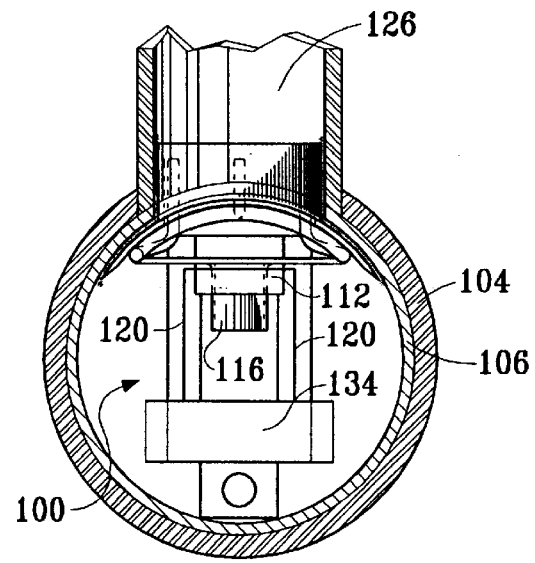
FIG. 2 is an end view of inverted-tee patch being installed into a lateral.

Referring to FIGS. 1 and 2, a side and end view of the robot mechanism 100 within a main pipeline 104 are respectively shown. The robot mechanism 100 includes an upper platform 108, an extension arm 112, a support cage 116, scissor multipliers 120, a lower platform 124, and a slide (not shown). The robot mechanism 100 attaches to a power assembly (not shown) which remotely activates the scissor multipliers 120 and rotates the robot mechanism 100.

The upper platform 108 at a forward end 130 is fixedly attached to the extension arm 112 which engages the support cage 116. The support cage 116 is adapted to removably hold a patch 118 in place for insertion into a lateral service pipe 126. The patch 118 in profile is shaped like an inverted-tee (see FIG. 8). Any overextension of the lateral service pipe 126 beyond an inner surface of the main pipeline 104 is typically ground away prior to insertion of the patch 118 so that the patch will mount flush within an inner surface of the pipeline 104, as further described below. Each side of the robot mechanism 100 has a scissor multiplier 120 which allows lateral extension. Two slots 128 on each end of the upper platform 108 engage each scissor multiplier 120.

The lower platform 124 and attached slide is typically positioned near the bottom of the pipeline and provides support for the scissor multiplier 120 and upper platform 108. A front end 134 of the lower platform 124 is attached to the slide which supports the front end while allowing it to easily move back and forth within the pipeline 104. A rear end 138 of the lower platform 124 attaches to the power assembly which has a scissor motor (not shown) and a rotation motor (not shown). The scissor motor activates the scissor multiplier 120 to change the elevation of the upper platform 108 with respect to the lower platform 124. The rotation motor rotates the robot mechanism 100 with respect to the power assembly. By rotating the robot mechanism 100, lateral lines not vertically aligned with the flow in the main pipeline 104 become aligned with the support cage 116.

The scissor multiplier 120 contracts and expands to respectively raise and lower the upper platform 108 with respect to the lower platform 124 under the control of the scissor motor. It is once again noted, there are two scissor multipliers 120 on opposite sides of the platforms 108, 124 (see FIG. 2). Slots 128 on the upper platform 108 and a slot 142 on the lower platform 124 engage the scissor multiplier 120. When the scissor multiplier 120 contracts and expands, pins 146 slide move within the slots 128, 142. As shown in FIG. 2, the patch is inserted into the lateral line 126 when the scissor multiplier 120 contracts from the partially expanded position depicted in FIG. 1.

Figure 3:
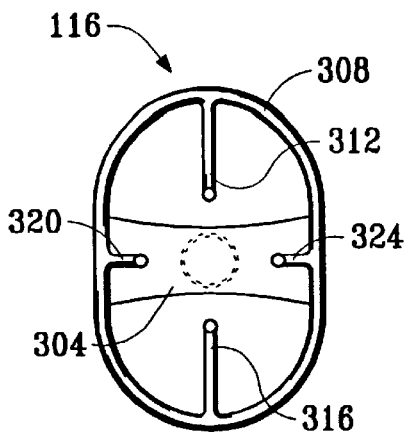
FIG. 3 is a top view of a support cage which engages the inverted-tee patch.
Figure 4:
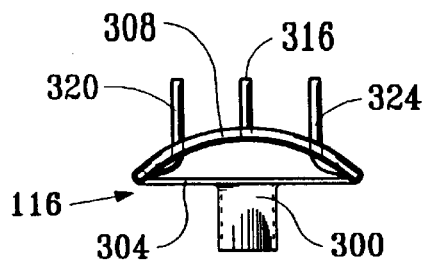
FIG. 4 is an end view of the support cage of FIG. 3.
Figure 5:
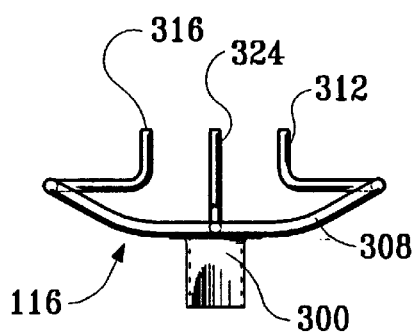
FIG. 5 is a side view of the support cage of FIG. 3.

Referring to FIGS. 3 through 5, the support cage 116 which removably holds the inverted-tee patch 118 is shown. The support cage includes a cylindrical stem 300, a cross member 304, an oval support 308, top and bottom talons 312, 316, and first and second talons 320, 324. The stem 300 mates with the extension arm 112 of the robot mechanism 100 for support. The cylindrical stem 300 is rigidly attached to a center of the cross member 304. Each end of the cross member 304 is rigidly attached to the oval support 308. To properly contour to the shape of the patch 118 and the inside of the pipeline 104, the oval support 308 when viewed from the end (see FIG. 4) is convex. The talons 312, 316, 320, 324 are connected on one end to the oval support 308 and shaped to removably mate with the inverted-tee patch 118. In this embodiment, only gravity keeps the patch 118 attached to the support cage 116, but other methods could also be used.

Figure 6:
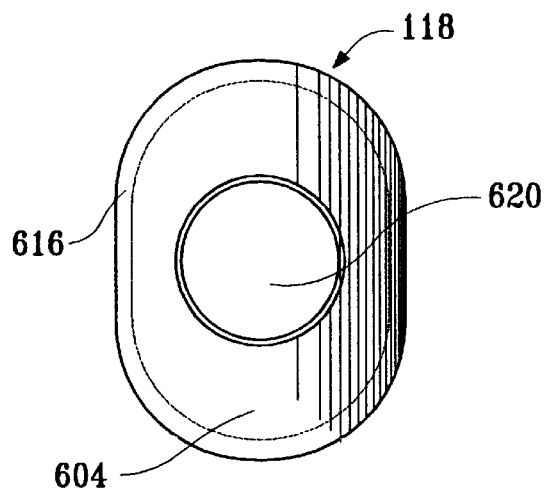
FIG. 6 is a top view of an inverted-tee patch.
Figure 7:
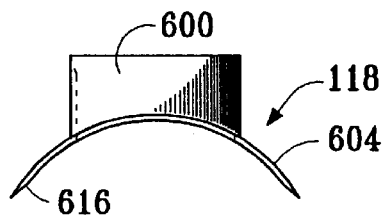
FIG. 7 is an end view of the inverted-tee patch of FIG. 6.
Figure 8:
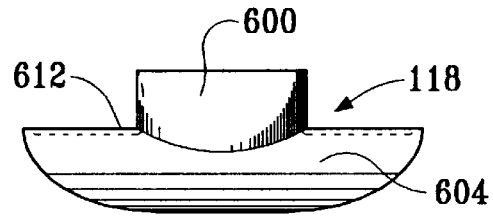
FIG. 8 is a side view of the inverted-tee patch of FIG. 6.

With reference to FIGS. 6 through 8, the inverted-tee shaped patch 118 is illustrated. Included in the patch 118 is a tubular stem 600, a convex flange 604, and an interconnection substrate 608 (shown in FIG. 1). In a preferred embodiment the substrate may be impregnated with an epoxy, resin, glue or other type of attachment mechanism. The tubular stem 600 mates to a circular cutout 620 in the flange. To avoid matter passing through the pipeline 104 from snagging on the flange 604, the edge of the stem is preferably beveled 616 toward the pipeline 104. The patch 118 is designed to seal the junction 122 between the main pipeline 104 and lateral service line 126. When the patch 118 of this embodiment is properly installed, the tubular stem 600 is mated inside the lateral line 126, the convex flange 604 is coextensive with an inner surface of the main pipeline 104, and the impregnated interconnection substrate 608 affixes the patch 118 to the junction 122. The patch 118 prevents cross-contamination between the material outside the pipes and the material inside the pipes. Preferably, the flange 604 is formed to fit the inner circumference of the main pipeline 104 and occupies a portion of the circumference equal to or greater than one and one-half times a diameter of the lateral line 126, although various shapes and sizes of the flange may be used as appreciated by one skilled in the art.

The interconnection substrate 608 (See FIG. 1) affixes the patch 118 to the pipe junction 122. To absorb epoxy or grout, the interconnection substrate 608 made of sponge, felt or the like, and is attached to a bonding surface 612 of the flange 604. Having the interconnection substrate 608 be absorbent allows easy transport of the epoxy which might otherwise drip off the flange 604. Additionally, the interconnection substrate 608 provides an additional barrier to prevent leakage at the junction 122. As can be appreciated by one skilled in the art, the junction 122 may have imperfections which would prevent epoxy alone from effectively sealing, but the deformable interconnection substrate 608 conforms to any imperfections to provide a better seal. The interconnection substrate is preferably able to compress to about one-third or less of its original thickness during installation. Preferably, the interconnection substrate 608 is a sponge material of a thickness greater than 5 mm which is impregnated with a liquid epoxy. In other embodiments, the impregnated interconnection substrate 608 can be anything which bonds the patch 188 to the junction 122 and substantially prevents foreign matter, including water, from seeping into the pipes 104, 126. In another embodiment, the interconnection substrate 608 is used in conjunction with an annular gasket on the stem 600 to provide improved sealing between the stem and the lateral service line 126 to help prevent seepage into the main pipeline 104.

Figure 9:
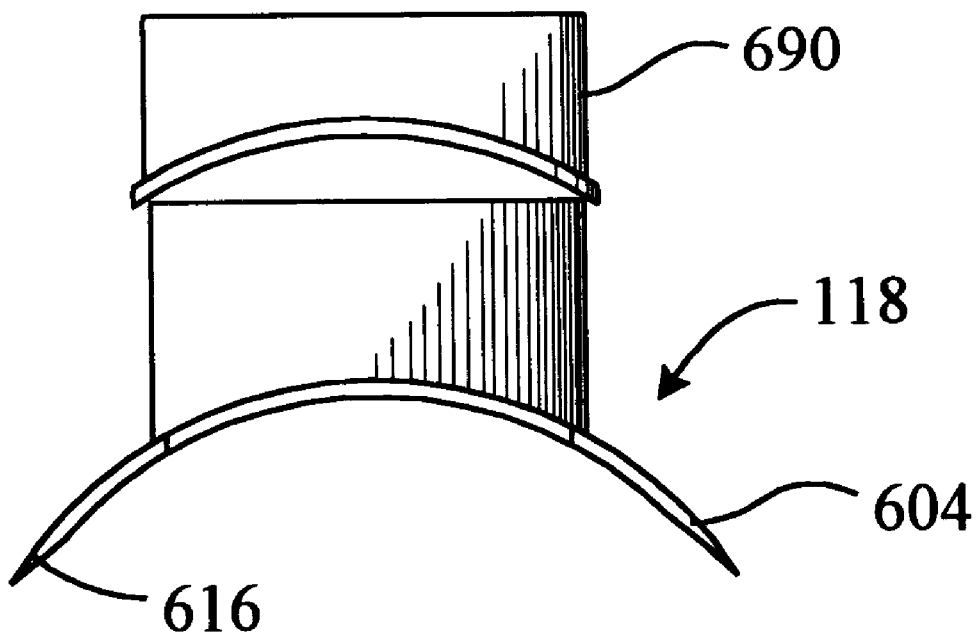
FIG. 9 is an end view of the inverted-tee patch of FIG. 6 and further showing a sleeve in position to be slid over the stem of the inverted-tee patch to increase the external diameter.

In an alternative embodiment of the present invention shown in FIG. 9, a sleeve or bushing 690 may be provided to selectively increase the diameter of the stem 600 and provide an improved seal with the lateral service line 126. More specifically, due to various intolerances of clay pipe and other pipe materials the exact internal diameter of the lateral service line 126 may vary. Therefore, to improve the seal between the lateral service line 126 internal diameter and the external diameter of the stem, a sleeve or bushing 690 may be positioned over the stem to increase its diameter. The bushing 690 may be made of a durable plastic or fiberglass, or alternatively plastic, felt, rubber or other similar materials commonly known in the plumbing and pipeline industries. Although the bushing 690 may have a length less than the total length of the stem, it is feasible that the bushing 690 have a length shorter than the total length of the stem and still be effective.

The following discusses a method of using the aforementioned robot mechanism 100, support cage 116 and patch 118 to perform a patching operation. The first step requires identifying the lateral service line 126 requiring a patch 118 after the installation of a liner in the main pipeline 104. Identification may be done visually by an operator or remotely using a video camera or other sensing device. Once the lateral service line 126 is identified, access is provided to the lateral service line 126 by drilling a hole through the liner with the use of a remotely controlled drill attached to a robotic apparatus which is pulled through the main pipeline 104. If the lateral line 126 overextends into the main pipeline 104, the excess can be trimmed with a robotic grinder or the like.

The patch 118 is typically prepared for attachment and placed on the support cage 116 before inserting the robot mechanism 100 into the main pipeline 104. This preparation may require attaching the interconnection substrate 608 to the bonding surface 612, at an earlier time, and applying the epoxy or grout to the interconnection substrate immediately prior to use. Alternatively, the substrate 608 may be pre-attached to the exterior surface of the flange and in a preferred embodiment, may be pre-impregnated with a glue or epoxy. The epoxy or grout typically has a viscous consistency for a period of time before hardening upon exposure to a catalyst. The catalyst for the hardening process may be air, heat, water, or any other suitable technique known in the art. Placing the patch 118 on the support cage 116 is typically performed before the robot mechanism 100 is inserted into the pipeline 104 because after insertion there may not be sufficient clearance between the pipeline wall and support cage 116.

In the next step, the support cage 116 holding the inverted-tee patch 118 is positioned so that when the support cage 116 is laterally extended, the patch 118 will mate with the lateral service line 126. This may require dragging the robot mechanism 100 and attached power assembly so that the patch 118 is longitudinally aligned in the main pipeline 104 with the lateral service line 126. Often, the lateral service line 126 is not aligned vertically with respect to the flow in the main pipeline 104. Under these circumstances, the power assembly activates its rotation motor to angularly align the patch 118 with the junction 122.

Once the patch 118 is properly positioned, the power assembly activates the scissor motor to contract the scissor multiplier 120. The contraction of the scissor pushes the support cage 116 and patch 118 toward the lateral line 126. In this way, the tubular stem 600 is inserted inside the lateral line 126 and the convex flange 604 is aligned with the inside of the main pipeline 104. The patch 118 is held in place with sufficient force until the epoxy or grout cures. Pressure is provided to the support cage 116 so that the interconnection material 608 is compressed to sufficiently fill-in any imperfections in the junction with interconnection substrate 608. In one embodiment, curing takes approximately 25 minutes. After curing, the epoxy or grout applied to the interconnection substrate 608 optimumly produces a water-tight seal between the lateral service line 126 and main pipeline 104 and holds the patch 118 rigidly in place.

After the scissor multiplier 120 is expanded to move the support cage 116 away from the patch 118 affixed to the junction 122, the robot mechanism 100 and power assembly are free to be removed from the pipeline 104. In this way, a patch 118 may be used to seal the pipe junction 122.

Figure 11:
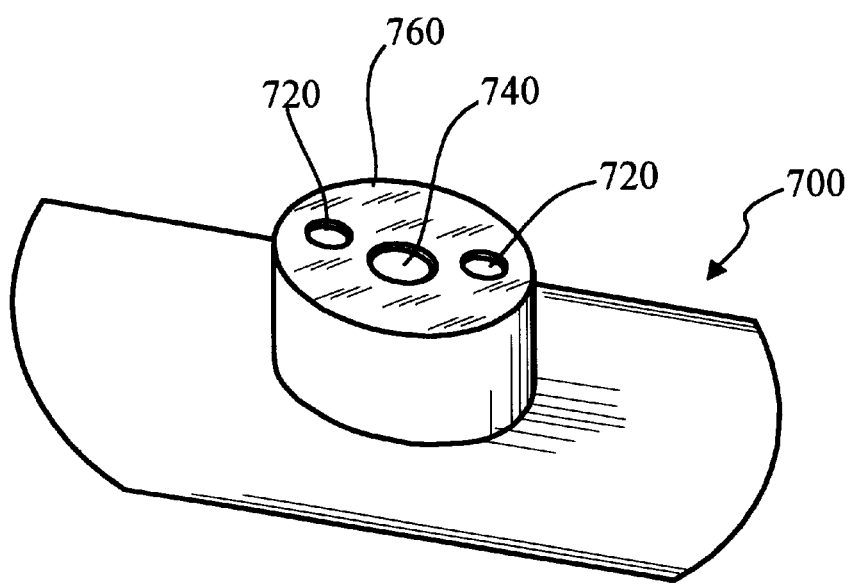
FIG. 11 is a perspective end view showing the heating element, having a convex outer surface which matingly engages the inverted-tee patch.

Referring now to FIG. 11, in another aspect of the present invention a support cage 116 with integral heating element 700 is provided which accelerates the curing of the epoxy/glue bonding and sealing agent which is positioned between the main pipeline 104 and the patch 118. The support cage integral heating apparatus 700 is preferably constructed of a rigid heat conducting material such as aluminum, stainless steel, although other metallic materials commonly known in the art may be used for the same purpose. In one embodiment of the present invention heat energy is provided to the heating apparatus 700 by a plurality of heat conducting wires being run throughout the interior of the support cage, which is in turn provided heat energy from a typical electrical outlet, or generator in remote locations. Alternatively, the wires, or heat trace materials commonly used to prevent the freezing of pipe could be positioned below or adjacent the support cage to provide the same heat energy.

In a preferred embodiment of the present invention shown in FIG. 11, the heating apparatus 700 is one integral piece of aluminum which has a convex outer surface which matingly engages the patch 118. The heating apparatus 700 additionally has a weep hole 740 to allow the drainage of any water which may accumulate on the upper surface of the heating element stem 760.

Preferably, the heating apparatus is capable of heating to a temperature of between about 50° F. and 400° F. The actual temperature and amount of time heat is applied is dependent on the type and amount of epoxy/bonding agent used and the ambient temperature at the time of installation of the patch 118. To provide this amount of heat energy, between about 4 and 20 amps of electrical current are necessary. Preferably the heat will allow the complete curing of the epoxy/bonding agent within about 10–25 minutes, although complete curing within about 10 minutes is more likely. Alternatively, ultra-violet light or radiation energy may be used to cure the interconnection substrate 608 in a time period of about 10–20 minutes.

In an alternative embodiment of the present invention, heat energy may be provided by a portable power source, such as portable batteries which may be interconnected to the support cage, or more likely to a portion of the robot mechanism 100. Further, the heat energy could be selectively provided by a timer device or by movement of the scissor multiplier 120 which is activated during application of the patch 118.

Figure 10:
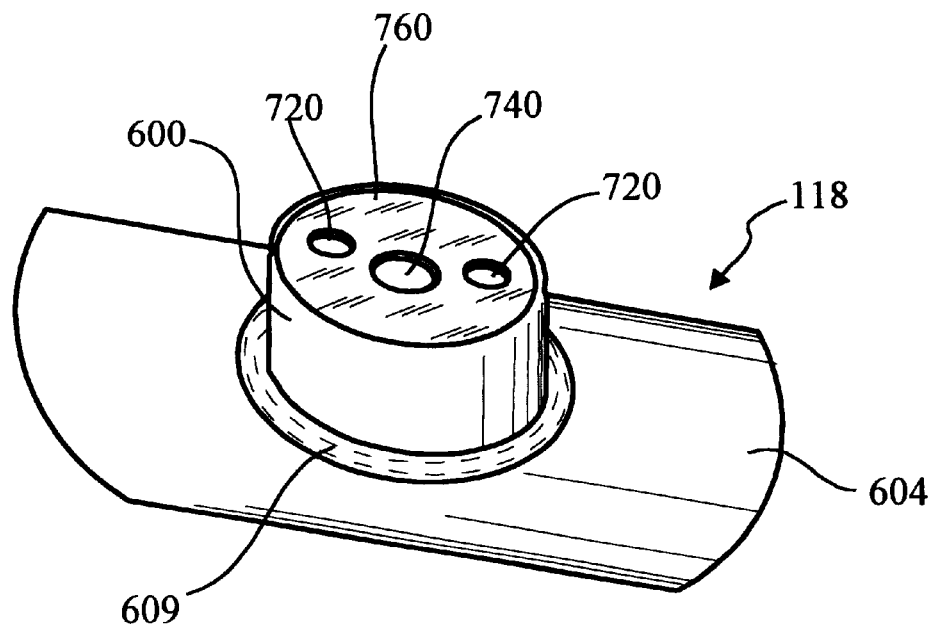
FIG. 10 is a perspective end view showing a support cage with integral heating element and the associated wiring connected thereto.

In a preferred embodiment of the present invention the patch utilizes a sponge glue ring 609 which is positioned on top of the patch 118 and designed to be compressed between the patch 118 and the internal surface of the pipe. The heating element 700 positioned below the patch 118 is shown in FIG. 10, along with the sponge glue ring 609 which is wrapped around the patch stem 600 at the bonding surface 612. Apertures (720) provided to receive attachment hardware for interconnecting the stem (760) to the flange (604) are also shown. The sponge glue ring 607 is typically saturated with a water activated grout and sealed with a non-permeable cellophane on other similar material. Just prior to installation, the cellophane or other sealing membrane is cut or removed with a knife and a two-part epoxy or glue is applied to the sponge glue ring 609. The patch is then positioned below the designated pipe junction, put into position with the extension arm 112 and then heat energy is provided to the patch 118 and sponge glue ring 609 or other interconnection substrate 608 to quickly secure the patch 118 at the junction pipe junction. The robot 100 is then removed from the pipe.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for remotely installing a patch to an underground junction between a main pipeline and a lateral service line, comprising the steps of:
   (a) providing a patch comprising:
      a tubular stem having a first end, a second end and a first length, for communication with the lateral service line;
      a convex flange having an exterior surface, an interior surface and a cutout portion operatively sized and interconnected to the first end of said tubular stem, wherein the second end of said tubular stem extends away from the exterior surface of said convex flange; and
      a sealing substrate positioned on said exterior surface of said convex flange for providing sealing engagement between said convex flange and an interior surface of the main pipeline;
   (b) determining a location of the junction between the main pipeline and the lateral service line;
   (c) removably attaching said patch to a support cage having a heating element;
   (d) positioning said patch proximate to the location of the underground junction;
   (e) activating a lateral extender to move said support cage from a first traveling position to a second engagement position so that said patch is positioned with said tubular stem within the lateral service line and said sealing substrate is positioned against an internal surface of the main pipeline proximate to said lateral service line;
   (f) providing a heat source to said sealing substrate through said heating element to accelerate the curing of said sealing substrate, wherein said patch becomes fixedly connected to the internal surface of the main pipeline;
   (g) deactivating the lateral extender to move said support cage from the second engagement position to the first traveling position; and
   (h) removing said lateral extender and said support cage from the main pipeline.

2. The method of claim 1, wherein said support cage is comprised of a metallic material.

3. The method of claim 1, wherein said support cage has an integral heating element which is interconnected to a remote-controlled energy source which can be selectively activated and deactivated to provide an electrical current to said heating element.

4. The method of claim 1, wherein said heat energy is provided to said heating element by at least one battery.

5. The method of claim 1, wherein heat energy is provided to said heating element when said lateral extender is activated to move said support cage from a first traveling position to said second engagement position.

6. The method of claim 1, wherein said support cage may reach a temperature between about 50° F. and 40° F. when providing heat energy to said sealing substrate.

7. The method of claim 1, wherein said support cage has a flange interconnected to a stem portion, wherein said support flange matingly engages said patch.

8. The method of claim 1, wherein said heating-element is interconnected to an exterior surface of said support cage.

9. A support cage adapted for supporting a patch for sealing a junction between a lateral pipeline and a main pipeline comprising:
   a flange having an interior surface and an exterior surface, said exterior surface having a convex shape for opposing an internal surface of the main pipeline;
   a stem extending outwardly from said exterior surface of said flange and adapted for supporting the patch; and
   a heating means in operable contact with at least a portion of said support cage for providing heat energy to the patch.

10. The support cage of claim 9, further comprising a weep hole extending through said stem to allow drainage of any fluid.

11. The support cage of claim 9, wherein said support cage has an eternal geometric shape which matingly engages a least a portion of the patch.

12. The support cage of claim 9, said heating means comprising at least one conductive wire for carrying an electrical current.

13. The support cage of claim 9, wherein said flange and said stem are comprised of a metallic material.

14. The support cage of claim 9, wherein said stem has a threaded end adapted for interconnection to said metallic flange.

15. The support cage of claim 9, wherein said heating means further comprises at least one battery.

16. The support cage of claim 9, wherein said heating means is capable of heating said support cage to a temperature of between about 50° F. and 400° F.

17. The support cage of claim 9, wherein said flange and said stem are comprised of aluminum.

18. The support cage of claim 9, wherein said flange has at least one aperture for receiving attachment hardware for interconnecting said flange to said stem.

* * * * *